(12) United States Patent
Liang (10) Patent No.: US 11,777,820 B2
(45) Date of Patent: Oct. 3, 2023

(54) QOS-AWARE PARALLEL FLEXIBLE SKYLINE SERVICE DISCOVERY METHOD

(71) Applicant: SOOCHOW UNIVERSITY, Suzhou (CN)

(72) Inventor: Helan Liang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 31 days.

(21) Appl. No.: 17/641,015

(22) PCT Filed: Mar. 5, 2021

(86) PCT No.: PCT/CN2021/079310
§ 371 (c)(1),
(2) Date: Mar. 7, 2022

(87) PCT Pub. No.: WO2022/178917
PCT Pub. Date: Sep. 1, 2022

(65) Prior Publication Data
US 2023/0155901 A1 May 18, 2023

(30) Foreign Application Priority Data

Feb. 25, 2021 (CN) .......................... 202110211321.6

(51) Int. Cl.
*H04L 29/08* (2006.01)
*H04L 41/50* (2022.01)
*H04L 67/61* (2022.01)
*H04L 41/5003* (2022.01)

(52) U.S. Cl.
CPC ...... *H04L 41/5058* (2013.01); *H04L 41/5003* (2013.01); *H04L 67/61* (2022.05)

(58) Field of Classification Search
CPC .. H04L 41/5058; H04L 67/61; H04L 41/5003
See application file for complete search history.

(56) References Cited

U.S. PATENT DOCUMENTS

2016/0173404 A1   6/2016   Pouyllau et al.

FOREIGN PATENT DOCUMENTS

| CN | 102158533 A | 8/2011 |
| CN | 109947904 A | 6/2019 |
| CN | 109976913 A | 7/2019 |
| CN | 110245022 A | 9/2019 |

*Primary Examiner* — Adnan M Mirza
(74) *Attorney, Agent, or Firm* — SZDC LAW P.C.

(57) ABSTRACT

The invention relates to a quality of service (QoS)-aware parallel flexible Skyline service discovery method, including: performing, by each parallel node, a tournament selection algorithm to trim candidate services inside the parallel node; then making each parallel node perform a block dominance algorithm to filter candidate services inside the parallel node to obtain local Skyline services; collecting all local Skyline services to form a first set, and then performing filtering on the first set by using the block dominance algorithm to obtain global Skyline services; and determining whether there is a first constraint in the global Skyline services, and if yes, performing processing by using a flexible Skyline service correction algorithm to obtain a flexible Skyline service set for output, or otherwise, directly outputting the global Skyline services. The present invention reduces calculation complexity, and improves the accuracy of service selection, thereby facilitating accurate, efficient filtering to obtain quality services.

7 Claims, 6 Drawing Sheets

QOS-AWARE PARALLEL FLEXIBLE SKYLINE SERVICE DISCOVERY METHOD

This application is the National Stage Application of PCT/CN2021/079310, filed on Mar. 5, 2021, which claims priority to Chinese Patent Application No. 202110211321.6, filed on Feb. 25, 2021, which is incorporated by reference for all purposes as if fully set forth herein.

FIELD OF THE INVENTION

The present invention relates to the field of network service technologies, and more particularly to a quality of service (QoS)-aware parallel flexible Skyline service discovery method.

DESCRIPTION OF THE RELATED ART

Driven by the pay-as-you-go business model of cloud computing, numerous service providers offer a wide range of services based on cloud platforms. With the rapid growth of services, the service search space has increased dramatically. Therefore, it becomes critical to reduce the difficulty of selection by deleting services of poor quality. Since each service has attributes such as time, cost, and availability, non-dominant services are selected through filtering based on QoS to reduce the complexity of service selection. The problem is defined as a QoS-aware Skyline service (also referred to as a non-dominant service) discovery problem. That is, a Skyline query is to select a subset from a given set S of D-dimensional data objects. No data object in the subset can be dominated by any other data object in S. A so-called dominance relationship means that in a data set S of a D-dimensional space, if a data object p is superior to another data object q in a dimension and the data object p is not inferior to the data object q in any other dimension (p is superior or equal to q), the data object p can dominate the data object q.

A Skyline query problem is to perform query processing on multidimensional data to return a set of data that is not inferior to other data in all dimensions and is superior to other data in at least one dimension. In the problem, each service is represented by a group of QoS attribute values, so that non-dominant services are selected through filtering based on QoS, thereby reducing the difficulty of service selection. At present, common Skyline service discovery methods include: SFS (sorting and filtering-based Skyline service discovery), BBS (branch and bound based Skyline service discovery), an improved block nested loop (BNL) method (BNL based Skyline service discovery), and the like. However, these methods are performed serially. Services need to be compared two by two to obtain dominance relationships between the services, and QoS attributes in all dimensions need to participate in comparison, resulting in very high calculation complexity of the comparison.

In consideration of the explosive growth in the number of services has led to a dramatic increase in search space, parallelization is an effective way to improve the efficiency of Skyline service discovery. Current research has gradually proposed parallel Skyline service discovery methods. However, the calculation efficiency of the methods still need to be further improved.

In addition, due to business requirements and customer preferences, there are usually various QoS constraints (such as deadline and cost constraints) and inter-service dependency and conflict constraints among services. However, existing Skyline service discovery methods all output hard Skyline services. None of the methods can support the above-mentioned QoS constraint, service dependency constraint, and other constraints, which tends to cause excessive or insufficient deletion of some adequate services, to eventually reduce the accuracy of service selection. Therefore, potential quality services fail to be accurately obtained through filtering. For example, even if some services are not Skyline services, when the services are selected together, a QoS discount can be obtained to achieve better competitiveness.

In summary, the existing Skyline service discovery methods have deficiencies of high calculation complexity and low accuracy of service selection, and potential quality services fail to be accurately obtained through filtering.

SUMMARY OF THE INVENTION

For this, a technical problem to be resolved by the present invention is to overcome deficiencies that Skyline service discovery methods in the prior art have high calculation complexity and low the accuracy of service selection.

To resolve the foregoing technical problem, the present invention provides a QoS-aware parallel flexible Skyline service discovery method, including the following steps:

S1) randomly allocating all candidate services of each task to a plurality of parallel nodes, and performing, by each parallel node, a tournament selection algorithm in parallel to filter and trim candidate services inside the parallel node;

S2) acquiring boundary values of service attributes of the candidate services after filtering and trimming, and making each parallel node perform block division according to the acquired boundary values of the service attributes; and reallocating the candidate services after filtering and trimming to the plurality of parallel nodes, and attributing candidate services allocated in each parallel node to a corresponding block;

S3) performing, by each parallel node, a block dominance algorithm to filter candidate services inside the parallel node to obtain local Skyline services;

S4) collecting all local Skyline services to form a first set, and then performing filtering on the first set by using the block dominance algorithm to obtain global Skyline services;

S5) determining whether there is a first constraint in the global Skyline services, and if yes, performing step S6), or otherwise, directly outputting the global Skyline services, where the first constraint includes a QoS constraint, an attribute dependency constraint, a service dependency constraint or a service conflict constraint; and S6) processing tasks involved in the first constraint by using a flexible Skyline service correction algorithm to obtain a flexible Skyline service set for output.

In an embodiment of the present invention, a method of performing, by each parallel node, a tournament selection algorithm to filter and trim candidate services inside the parallel node in Step S1) includes: selecting a plurality of candidate services from the candidate services inside the parallel node according to a tournament selection rule as labeled services, comparing the remaining candidate services with the plurality of labeled services, and then eliminating a candidate service inferior to at least one labeled service.

In an embodiment of the present invention, interval values of service attributes of candidate services in different blocks are not identical, it indicates that a service attribute is better when an interval value of the service attribute is larger, and a method of performing, by each parallel node, a block dominance algorithm to filter candidate services inside the parallel node to obtain local Skyline services in Step S3) includes:

sequentially performing filtering a plurality of times, where a quantity of times of filtering is equal to a quantity of block division, and candidate services eventually obtained after filtering a plurality of times are the local Skyline services; and selecting one block as a representative block in each filtering process, where a different representative block is selected in each filtering process; and each filtering process includes: first performing filtering to obtain Skyline services in the representative block, then separately comparing candidate services in another block with a block number less than that of the representative block with the Skyline services in the representative block to acquire dominance relationships, and then deleting candidate services that are in another block with a block number less than that of the representative block and are dominated by the Skyline services in the representative block, where during each filtering process, if an interval value of one service attribute of a candidate service in another block is less than an interval value of a corresponding service attribute of a Skyline service in the representative block, the service attribute no longer participates in comparison.

In an embodiment of the present invention, if there is a QoS constraint between different tasks, a method of processing tasks involved in the QoS constraint by using a flexible Skyline service correction algorithm in step S6) includes: defining a task to be processed by using the flexible Skyline service correction algorithm as a to-be-determined task, defining another task having a QoS constraint with the to-be-determined task as a correlated task, obtaining limit values of QoS values of global Skyline services in each correlated task, aggregating limit values of QoS values in all correlated tasks to calculate a correlation value, performing aggregation calculation on the QoS value of each global Skyline service in the to-be-determined task and the correlation value to obtain a determination value, and deleting a corresponding global Skyline service that is in the to-be-determined task and has a determination value that fails to meet the QoS constraint.

In an embodiment of the present invention, if the global Skyline services have an attribute dependency constraint, a method of processing tasks involved in the attribute dependency constraint by using a flexible Skyline service correction algorithm in step S6) includes: defining a non-Skyline service having an attribute dependency constraint with the global Skyline services as a to-be-processed service, determining whether the to-be-processed service can be a non-dominant service in a task to which the to-be-processed service belongs after the attribute dependency constraint is performed, and if yes, adding the to-be-processed service to the task to which the to-be-processed service belongs, or otherwise, skipping processing.

In an embodiment of the present invention, if the global Skyline services have a service dependency constraint, a method of processing tasks involved in the service dependency constraint by using a flexible Skyline service correction algorithm in step S6) includes: defining a task to be processed by using the flexible Skyline service correction algorithm as a to-be-determined task, and defining all candidate services that have a service dependency constraint with the global Skyline services in the to-be-determined task as antecedent dependency services;

if there is a unique global Skyline service in the to-be-determined task, determining whether the antecedent dependency services all exist in global Skyline services in other tasks other than the to-be-determined task, where if yes, processing is skipped, or if not, an antecedent dependency service is added to a task to which the antecedent dependency service belongs, a first suboptimal service is added to the to-be-determined task, there is no service dependency constraint between the first suboptimal service and the antecedent dependency service, and the first suboptimal service can be a non-dominant service when the global Skyline service is not considered in the to-be-determined task; and if there are nonunique global Skyline services in the to-be-determined task, skipping processing.

In an embodiment of the present invention, if the global Skyline services have a service conflict constraint, a method of processing tasks involved in the service conflict constraint by using a flexible Skyline service correction algorithm in step S6) includes: defining a task to be processed by using the flexible Skyline service correction algorithm as a to-be-determined task, defining all candidate services that have a service conflict constraint with the global Skyline services in the to-be-determined task as antecedent conflict services, and if there is a unique global Skyline service in the to-be-determined task, determining whether an antecedent conflict service exists in a global Skyline service in another task other than the to-be-determined task and the antecedent conflict service is a unique global Skyline service in the task to which the antecedent conflict service belongs, where if yes, a second suboptimal service is added to the to-be-determined task, and a third suboptimal service is added to the task to which the antecedent conflict service belongs, or if not, processing is skipped, where the second suboptimal service does not have a service conflict constraint with the antecedent conflict service and can be a non-dominant service when the global Skyline service is not considered in the to-be-determined task; and the third suboptimal service does not have a service conflict constraint with the global Skyline service in the to-be-determined task and can be a non-dominant service when the antecedent conflict service is not considered in the task to which the antecedent conflict service belongs.

The foregoing technical solutions of the present invention has the following advantages as compared with the prior art:

For the QoS-aware parallel flexible Skyline service discovery method in the present invention, candidate services are filtered a plurality of times by using a tournament selection algorithm, a block dominance algorithm, and a flexible Skyline service correction algorithm, thereby greatly reducing calculation complexity and adapting to QoS constraints, attribute dependency constraints, service dependency constraints and service conflict constraints, so that the phenomenon of excessive or insufficient deletion of some adequate services is avoided, the accuracy of service selection is improved, and potential quality services can be accurately obtained through filtering.

BRIEF DESCRIPTION OF THE DRAWINGS

To make the content of the present invention clearer and more comprehensible, the present invention is further described in detail below according to specific embodiments of the present invention and the accompanying drawings. Where.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

For ease of understanding, the following terminology is first explained. "Skyline service" is a non-dominant service, indicating that the service cannot be dominated by another service in a task that the service belongs. "Dominance" means that a data object p can dominate another data object q if the data object p is superior to the data object q in at least a dimension in a data set S in a D-dimensional space and the data object p is not inferior to the data object q in any other dimension (p is superior to or equal to q). For example, a service has two service attributes: time and reputation. If a time of a first service is shorter (better) than a time of a second service and if a reputation of the first service is not lower than a reputation of the second service, the first service dominates the second service.

Figure 1:
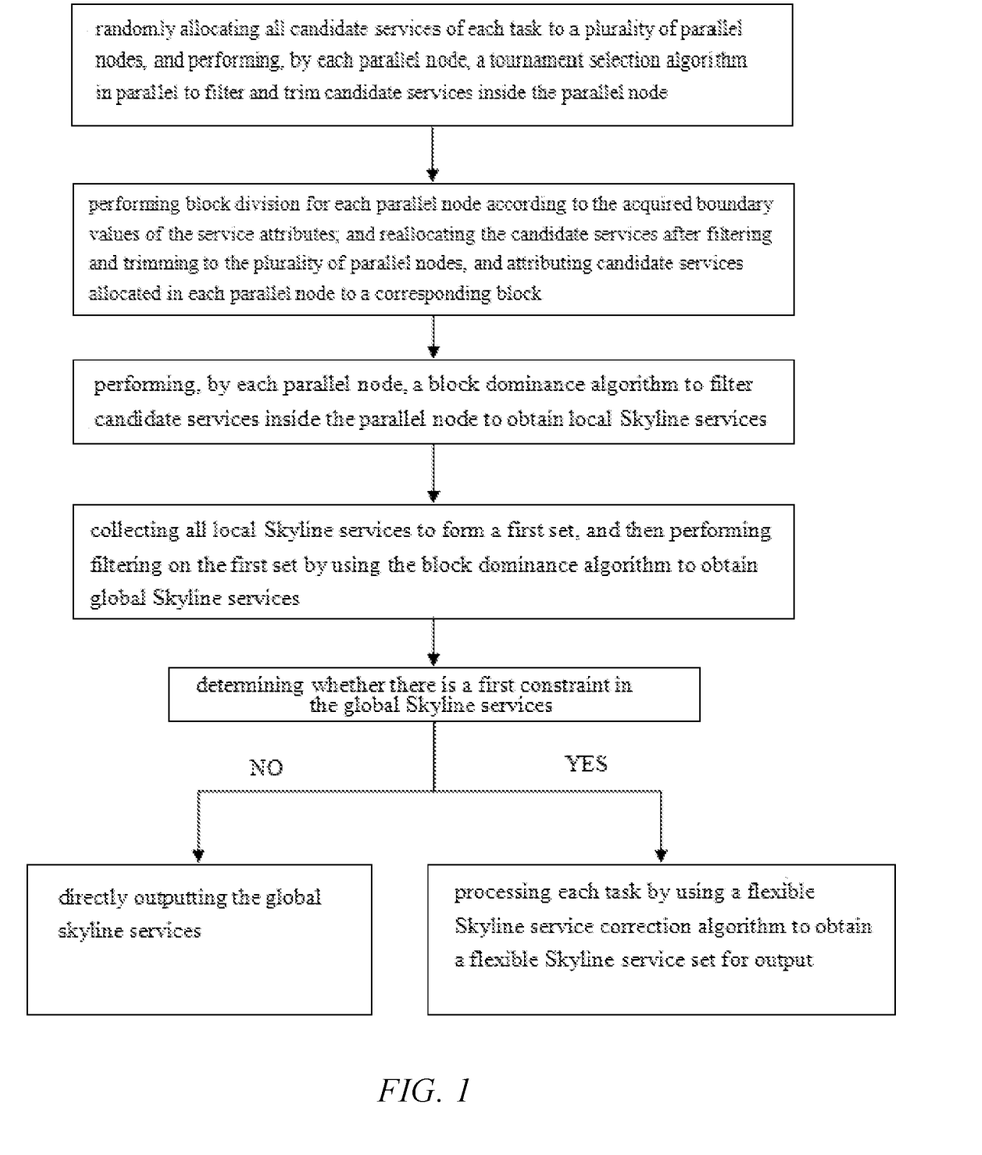
FIG. 1 is a block flowchart of a QoS-aware parallel flexible Skyline service discovery method according to the present invention.

Referring to FIG. 1, the present invention discloses a QoS-aware parallel flexible Skyline service discovery method, including the following steps:

S1) randomly allocating all candidate services of each task to a plurality of parallel nodes, and performing, by each parallel node, a tournament selection algorithm in parallel to filter and trim candidate services inside the parallel node.

S2) acquiring boundary values of service attributes of the candidate services after filtering and trimming, and making each parallel node perform block division according to the acquired boundary values of the service attributes; and reallocating the candidate services after filtering and trimming to the plurality of parallel nodes, and attributing candidate services allocated in each parallel node to a corresponding block.

For example, service attributes include five quality attributes {time, cost, reputation, success rate, availability}. Value ranges of the attributes are respectively [6, 12], [5, 8], [0.95, 0.99], [0.91, 0.96], and [0.94, 0.99]. 6, 12, 5, 8, and the like are all boundary values of the service attributes. The value range of each attribute is divided into two intervals. For example, the value range of time is divided into two intervals [6, 9] and [9, 12]. By analogy, the value ranges of all other attributes are also separately divided into two intervals. In this case, $2^5-1=31$ blocks may be obtained through division in one parallel node. Each block corresponds to one interval value set sg. It is assumed that QoS values (QoS attribute values) of a service A are respectively 7 h, $7, 0.96, 0.95, and 0.95. An interval value set of the service A is sg={1,0,0,1,0}. "1" and "0" are both interval values. "1" represents "superior to", and "0" represents "inferior to". For example, a time attribute is a descending attribute, and the time attribute is better when the value is smaller. Therefore, in terms of the time attribute, a service falling in the value range [6, 9] is definitely superior to a service falling in the value range [10,12]. In terms of the time attribute, the QoS value of the service A is 7 h and falls in the value range [6, 9]. Therefore, an interval value of the service A is recorded as "1". By analogy, it can be known that the interval value set sg of the service is sg={1,0,0,1,0}. It is obtained that the service A belongs to the block of $2^0+2^3=9$, that is, belongs to, Block 9. The exponent "0" of "$2^0$" in $2^0+2^3=9$ represents that one "1" in sg={1,0,0,1,0} appears in the 0th position in sg. The exponent "3" of "$2^3$" represents that the other "1" in sg={1,0,0,1,0} appears in the $3^{rd}$ position in sg. In another example, sg of a service B is {0,1,1,1,1}. A block number to which the service B belongs is $2^1+2^2+2^3+2^4=30$. If sg of a service C is {1,0,1,1,1}, a block number to which the service C belongs is $2^0+2^2+2^3+2^4=29$.

S3) performing, by each parallel node, a block dominance algorithm to filter candidate services inside the current parallel node to obtain local Skyline services. That is, the remaining candidate services obtained after eventual filtering inside the parallel node ends are all referred to as local Skyline services;

S4) collecting all local Skyline services to form a first set, and then performing filtering on the first set by using the block dominance algorithm to obtain global Skyline services. That is, the eventual remaining local Skyline services obtained after filtering of all local Skyline services are all referred to as the global Skyline services.

S5) determining whether there is a first constraint in the global Skyline services, and if yes, performing step S6), or otherwise, directly outputting the global Skyline services.

The first constraint includes a QoS constraint, an attribute dependency constraint, a service dependency constraint or a service conflict constraint.

The QoS constraint usually exists between different tasks. The attribute dependency constraint, the service dependency constraint or the service conflict constraint exists between different services.

S6) processing tasks involved in the first constraint by using a flexible Skyline service correction algorithm for output. That is, addition or deletion is performed on services in tasks involved in the first constraint for output. A service outputted after processing is referred to as a flexible Skyline service. All flexible Skyline services are collected to form a flexible Skyline service set.

In the foregoing QoS-aware parallel flexible Skyline service discovery method, candidate services are filtered and trimmed a plurality of times by using a tournament selection algorithm, a block dominance algorithm, and a flexible Skyline service correction algorithm, thereby greatly reducing calculation complexity and improving the accuracy of service selection. The tournament selection algorithm can partially label services to delete services that are clearly inferior, to avoid two-by-two comparison between a lot of dominant services. Compared with a conventional Skyline service discovery method in which any service must participate in two-by-two comparison, calculation and search complexity are effectively reduced. The block dominance algorithm then performs accurate filtering on candidate services after the deletion using the tournament selection algorithm. The block dominance algorithm divides the remaining services into blocks, so that dominance relationships between service blocks can be accurately defined. Skyline service discovery is quickly implemented by using the block dominance algorithm, to further reduce the calculation complexity of a Skyline service discovery problem. The flexible Skyline service correction algorithm corrects Skyline services to adapt to QoS constraints, attribute dependency constraints, service dependency constraints or service conflict constraints. Therefore, the phenomenon of excessive or insufficient deletion of some adequate services is avoided, to improve the accuracy of service selection, so that potential quality services can be accurately obtained through filtering.

In addition, the tournament selection algorithm and the block dominance algorithm are separately performed for the reason that the number of services of each parallel node may vary after the tournament selection algorithm. Therefore, the calculation of each parallel node can be balanced by performing block division again. Block division is performed according to uniform boundary values of service attributes, to simplify calculations.

In an embodiment, a method of performing, by each parallel node, a tournament selection algorithm to filter and trim candidate services inside the parallel node in Step S1) includes the following steps: Select a plurality of candidate services from the candidate services inside the parallel node according to a tournament selection rule as labeled services. It may be understood that a label service is usually a superior candidate service. Compare the remaining candidate services with the plurality of labeled services. Then eliminate a candidate service inferior to at least one labeled service. That is, as long as a candidate service is inferior to one labeled service, the candidate service is eliminated.

The performance of the tournament selection algorithm is highly dependent on QoS labeling. Because each service only needs to be compared with a label, two-by-two comparison between a lot of dominant services is avoided, and services are partially labeled to delete services that are clearly inferior, thereby greatly reducing calculation complexity.

In an embodiment, interval values of service attributes of candidate services in different blocks are not identical. That is, different blocks have different interval values in at least one service attribute. It indicates that a service attribute is better when an interval value of the service attribute is larger. For example, an interval value set of Block 29 is sg={1,0, 1,1,1}, and an interval value set of Block 30 is sg={0,1,1, 1,1}. Elements in each interval value set sg respectively represent interval values of different service attributes. The five elements in sg respectively represent interval values of the first, second, third, fourth, and fifth service attributes from left to right. Block 29 and Block 30 have different interval values in the first service attribute and the second service attribute. In the first service attribute, the interval value "1" of Block 29 is greater than that of Block 30. Therefore, in the first service attribute, all services on Block 29 are superior to services on Block 30. Similarly, in the second service attribute, the services on Block 29 are inferior to the services on Block 30.

A method of performing, by each parallel node, a block dominance algorithm to filter candidate services inside the parallel node to obtain local Skyline services in Step S3) includes the following steps:

sequentially perform filtering N times, where a quantity N of times of filtering is equal to a quantity of block division, and candidate services eventually obtained after the N times of filtering are the local Skyline services. For example, if a quantity of block division inside each parallel node is 31, filtering needs to be performed 31 times. Filtering needs to be completed before a next time of filtering can be performed.

selecting one block as a representative block in each filtering process, where a different representative block is selected in each filtering process.

Each filtering process includes first performing filtering to obtain Skyline services in the representative block, then separately comparing candidate services in another block with a block number less than that of the representative block with the Skyline services in the representative block to acquire dominance relationships between two services, and then deleting candidate services that are in another block with a block number less than that of the representative block and are dominated by the Skyline services in the representative block.

Each block corresponds to one block number. During each filtering process, it is only necessary to compare Skyline services in a block with a block number less than that of the representative block and the representative block, so that the calculation efficiency can be effectively improved.

During each filtering process, if an interval value of one service attribute of a candidate service in another block is less than an interval value of a corresponding service attribute of a Skyline service in the representative block, the service attribute no longer participates in comparison. In this case, it is only necessary to perform comparison on QoS values of other service attributes. A filtering process of the foregoing block dominance algorithm is described below by using an example: If a candidate service has five QoS evaluation criteria, that is, has five service attributes: time, cost, reputation, success rate, and availability. First, $2^5-1=31$ blocks are obtained through division using a block division method. Skyline services in Block 31 are calculated. If the Skyline services in Block 31 are not empty, services in Block 0 are directly deleted. Because an interval value set of Block 0 is sg={0,0,0,0,0}, interval values in attributes in all dimensions are inferior to interval values of Block 31. Therefore, Block 0 may be first deleted. Five elements in the interval value set sg respectively represent interval values of five service attributes "time, cost, reputation, success rate, and availability" from left to right. According to a block dominance principle, filtering is performed for the first time. Block 31 is used as a representative block in the current time of filtering. Services that are in Block 0 to Block 30 and are dominated by the Skyline services in Block 31 are sequentially deleted. Block 30 is used as an example. Because an interval value set of Block 31 is sg={1,1,1,1,1} and an interval value set of Block 30 is sg={0,1,1,1,1}, it may be learned according to the block dominance rule that Block 31 is superior to Block 30 in terms of the time attribute. Therefore, during the calculation to determine whether services in Block 30 are dominated by the Skyline services in Block 31, values of the time attribute do not need to be considered. That is, the time service attribute no longer participates in comparison. It is only necessary to compare dominance relationships of candidate services in terms of the other four service attributes, so that the calculation efficiency of the dominance relationships can be improved. By analogy, calculation can be simplified to different degrees for services in all the other Block 29 to Block 1 according to the block dominance principle. Skyline services in Block 30 to Block 1 are sequentially compared with the Skyline services in Block 31 to determine dominance relationships between Skyline services. Candidate services that are in Block 30 to Block 1 and are dominated by the Skyline services in Block 31 are deleted, the first time of filtering is completed. Next, second time of filtering is performed. Block 30 is used as a representative block in the current time of filtering. The Skyline services in Block 30 are calculated, and Skyline services in Block 29 to Block 1 are sequentially compared with the Skyline services in Block 30 to determine dominance relationships between Skyline services. Candidate services that are in Block 29 to Block 1 and are dominated by the Skyline services in Block 30 are deleted, to complete the second time of filtering. By analogy, the foregoing filtering process keeps being repeated until the Skyline services in Block 1 are found. In this case, candidate services, that is, Skyline services, in the parallel node are referred to as the local Skyline services.

In the foregoing block dominance algorithm, block division is performed by using service attribute interval values. QoS attributes from different blocks can be quickly determined through comparison of service attribute interval values, thereby avoiding comparison of inferior service attributes, to ensure that services with high interval values are not dominated by services with low interval values. Compared with a calculation manner that "all service attributes must be taken into account to determine dominance relationships between services" in an existing method, the calculation of dominance relationships between candidate services from different blocks is greatly simplified, so that a large number of unnecessary calculations between candidate services can be avoided, thereby reducing calculation complexity, improving the overall speed of calculating the dominance relationships between candidate services, and improving calculation efficiency.

In an embodiment, if there is a QoS constraint between different tasks, a method of processing tasks involved in the QoS constraint by using a flexible Skyline service correction algorithm in step S6) includes: defining a task to be processed by using the flexible Skyline service correction algorithm as a to-be-determined task, defining another task having a QoS constraint with the to-be-determined task as a correlated task, obtaining limit values of QoS values of global Skyline services in each correlated task, aggregating limit values of QoS values in all correlated tasks to calculate a correlation value, performing aggregation calculation on the QoS value of each global Skyline service in the to-be-determined task and the correlation value to obtain a determination value, and deleting a corresponding global Skyline service that is in the to-be-determined task and has a determination value that fails to meet the QoS constraint.

For example, there is a task sequence $t_{23} \rightarrow t_{24} \rightarrow t_{25}$. A description of the QoS constraint is as follows: After the task $t_{23}$ starts to be performed, the abstract task $t_{25}$ needs to be completed within a time of 12 h. It is assumed that a minimum time for all Skyline services for the task $t_{23}$ is 3 hours, and that for the task $t_{24}$ is 4 hours. To meet the QoS constraint, for a Skyline service with an execution time greater than 5 h in the task $t_{25}$ cannot form a feasible execution plan, a Skyline service with an execution time greater than 5 h in the task $t_{25}$ can be deleted. Specifically, the task $t_{25}$ is defined as a to-be-determined task. Both the task $t_{23}$ and the task $t_{24}$ are correlated tasks. A limit value of QoS values of the task $t_{23}$ is 3. A limit value of QoS values of the task $t_{24}$ is 4. The limit values are added to obtain a correlation value 3+4=7. Then QoS values of all global Skyline services that can perform the task $t_{25}$ are respectively added to the correlation value "7" to obtain determination values. For example, one global Skyline service that can perform the task $t_{25}$ is A, and a QoS value of the service A is 6. A determination value is 6+7=13. The determination value is 13>12. That is, the determination value is greater than "12 hours" of the QoS constraint. Therefore, the service A cannot form a feasible execution plan. The service A is deleted from the services that can perform the task $t_{25}$.

When there is a QoS constraint between different tasks, global Skyline services in any task in the QoS constraint can be further trimmed by using the foregoing flexible Skyline service correction algorithm, to trim away some tasks that cannot form an optimal execution plan.

In an embodiment, if the global Skyline services have an attribute dependency constraint, a method of processing tasks involved in the attribute dependency constraint by using a flexible Skyline service correction algorithm in step S6) includes: defining a non-Skyline service having an attribute dependency constraint with the global Skyline services as a to-be-processed service, determining whether the to-be-processed service can be a non-dominant service in a task to which the to-be-processed service belongs after the attribute dependency constraint is performed, and if yes, readding the to-be-processed service to the task to which the to-be-processed service belongs, or otherwise, skipping processing.

For example, there is an attribute dependency constraint between services $s_{22\_1}$ and $s_{24\_3}$. A description of the attribute dependency constraint is as follows: If the services $s_{22\_1}$ and $s_{24\_3}$ are selected at the same time, a discount of $2 can be obtained. It is assumed that $s_{22\_1}$ is a non-Skyline service with a cost of $7. According to the foregoing constraint, if $s_{22\_1}$ and $s_{24\_3}$ are both chosen, the cost is reduced to $5. After the attribute dependency constraint is performed for $s_{22\_1}$, that is, when a discount is obtained to reduce the price to $5, that is, after the QoS value is updated to "5", $s_{22\_1}$ cannot be a Skyline service (non-dominant service) in a task $t_{22}$ to which $s_{22\_1}$ belongs, and $s_{22\_1}$ cannot appear in an optimal execution plan. Otherwise, it indicates that the service $s_{22\_1}$ may be a Skyline service after attribute optimization, that is, may appear in an optimal execution plan. Therefore, the service $s_{22\_1}$ needs to be added to the task $t_{22}$ to which $s_{22\_1}$ belongs, and is eventually outputted as a flexible Skyline service.

In an embodiment, if the global Skyline services have a service dependency constraint, a method of processing tasks involved in the service dependency constraint by using a flexible Skyline service correction algorithm in step S6) includes: defining a task to be processed by using the flexible Skyline service correction algorithm as a to-be-determined task, and defining all candidate services that have a service dependency constraint with the global Skyline services in the to-be-determined task as antecedent dependency services;

if there is a unique global Skyline service in the to-be-determined task, determining whether the antecedent dependency services all exist in global Skyline services in other tasks (tasks other than the to-be-determined task) other than the to-be-determined task, where if yes, it indicates that the antecedent dependency services are all non-dominant services and can be chosen, and no processing is required in this case, or if not, it indicates that the antecedent dependency services are not all non-dominant services and cannot be chosen at the same time, an antecedent dependency service needs to be added to a task to which the antecedent dependency service belongs, and a first suboptimal service is added to the to-be-determined task, so that all global Skyline services of the service dependency constraint can be chosen at the same time to form an executable plan; and if there are nonunique global Skyline services in the to-be-determined task, skipping processing.

There is no service dependency constraint between the first suboptimal service and the antecedent dependency service, and the first suboptimal service can be a non-dominant service when a unique global Skyline service that exists previously inside the to-be-determined task is not considered in the to-be-determined task.

For example, a description of one service dependency constraint is as follows: A service $s_{18\_2}$ can be selected only when both a service $s_{14\_3}$ and a service $s_{15\_5}$ are selected. A task $t_{18}$ to which the service $s_{18\_2}$ belongs is defined as a to-be-determined task. Both the service $s_{14\_3}$ and the service $s_{15\_5}$ are antecedent dependency services. It is assumed that the service $s_{18\_2}$ is a unique non-dominant service (Skyline service) in the to-be-determined task $t_{18}$, and the service $s_{14\_3}$ and the service $s_{15\_5}$ are not both non-dominant services (Skyline services). The service $s_{14\_3}$ and the service $s_{15\_5}$ cannot be chosen at the same time. In this case, the service $s_{18\_2}$, the service $s_{14\_3}$, and the service $s_{15\_5}$ cannot be selected at the same time, and cannot form a feasible execution plan. To formulate a feasible execution plan, first, a suboptimal service is added to the to-be-determined task $t_{18}$. The so-called suboptimal service is a service that does not have a service dependency constraint with the antecedent dependent services and can be a non-dominant service (Skyline service) when the service $s_{18\_2}$ is not considered in the to-be-determined task $t_{18}$, and is referred to as a "first suboptimal service". In this case, the "first suboptimal service" can be combined with existing Skyline services in the tasks $t_{14}$ and tis, to formulate a feasible execution plan. Next, the antecedent dependency services $s_{14\_3}$ and $s_{15\_5}$ are respectively added to the tasks $t_{14}$ and tis to which $s_{14\_3}$ and $s_{15\_5}$ respectively belong. In this way, $s_{14\_3}$ and $s_{15\_5}$ may be combined with the service $s_{18\_2}$, to formulate a feasible execution plan.

In an embodiment, if the global Skyline services have a service conflict constraint, a method of processing tasks involved in the service conflict constraint by using a flexible Skyline service correction algorithm in step S6) includes: defining a task to be processed by using the flexible Skyline service correction algorithm as a to-be-determined task, defining all candidate services that have a service conflict constraint with the global Skyline services in the to-be-determined task as antecedent conflict services, and if there is a unique global Skyline service in the to-be-determined task, determining whether "an antecedent conflict service exists in a global Skyline service in another task other than the to-be-determined task and the antecedent conflict service is a unique global Skyline service in the task to which the antecedent conflict service belongs", where if yes, it indicates that the antecedent conflict service is a unique non-dominant service in the task to which the antecedent conflict service belongs, because only antecedent conflict services can be chosen to form an execution plan but in this case a corresponding service that is in a to-be-determined task and has a service conflict constraint with the antecedent conflict services cannot be chosen, and in this case, a second suboptimal service needs to be added to the to-be-determined task, and a third suboptimal service needs to be added to the task to which the antecedent conflict service belongs, to form an executable plan, or if not, it indicates that the antecedent conflict service is not a non-dominant service or not a unique non-dominant service and therefore an antecedent conflict service can be not chosen to form an execution plan, and in this case, a corresponding service the is in the to-be-determined task and has a service conflict constraint with the antecedent conflict services cannot be chosen, and no processing is required in this case.

The second suboptimal service does not have a service conflict constraint with the antecedent conflict service and can be a non-dominant service when a unique global Skyline service that exists previously inside the to-be-determined task is not considered in the to-be-determined task.

the third suboptimal service does not have a service conflict constraint with the global Skyline service in the to-be-determined task and can be a non-dominant service when the antecedent conflict service is not considered in the task to which the antecedent conflict service belongs.

For example, a description of one service conflict constraint is as follows: Due to technical incompatibility, services $s_{23\_5}$ and $s_{24\_8}$ cannot be selected at the same time. The task $t_{24}$ to which the service $s_{24\_8}$ belongs is defined as a to-be-determined task, and the service $s_{23\_5}$ is an antecedent conflict service. It is assumed that the antecedent conflict service $s_{23\_5}$ is a unique non-dominant service (Skyline service) of the task $t_{23}$, and the service $s_{24\_8}$ is a unique non-dominant service (Skyline service) of the task $t_{24}$. It may be seen that $s_{23\_5}$ and $s_{24\_8}$ are unique candidate services. Due to technical incompatibility, $s_{23\_5}$ and $s_{24\_8}$ cannot be combined, and as a result a feasible execution plan cannot be obtained. To formulate a feasible execution plan, the following manner may be used: A second suboptimal service is added to the to-be-determined task $t_{24}$, and a third suboptimal service is added to the task $t_{23}$ to which the antecedent conflict service belongs. The so-called second suboptimal service is a service that does not have a service conflict constraint with the antecedent conflict services $s_{23\_5}$ and can be a non-dominant service when the service $s_{24\_8}$ is not considered in the to-be-determined task $t_{24}$. That is, the second suboptimal service is a service suboptimal to the service $s_{24\_8}$. The third suboptimal service does not have a service conflict constraint with the service $s_{24\_8}$ in the to-be-determined task $t_{24}$ and can be a non-dominant service when the service $s_{23\_5}$ is not considered in the task $t_{23}$ to which the service belongs. That is, the third suboptimal service is a service suboptimal to the service $s_{23\_5}$. In this way, the "second suboptimal service" may be combined with the service $s_{23\_5}$ to form a feasible execution plan. The "third suboptimal service" may also be combined with the service $s_{24\_8}$ to form a feasible execution plan.

A small-scale example is used to verify below the effectiveness of the foregoing service discovery method.

A cluster environment is built based on Docker and Spark. The environment includes one master mode and four worker nodes. One executor is run on each worker node (parallel node). The hardware environment is Huawei's flexible cloud server configured with 8vCPUs and 64-GB memory. Parameters of the method are as follows: The scale of the tournament selection algorithm is k=5, and the scale of the labeled services is ps=5%. All algorithms are implemented based on Python programming.

Figure 2:
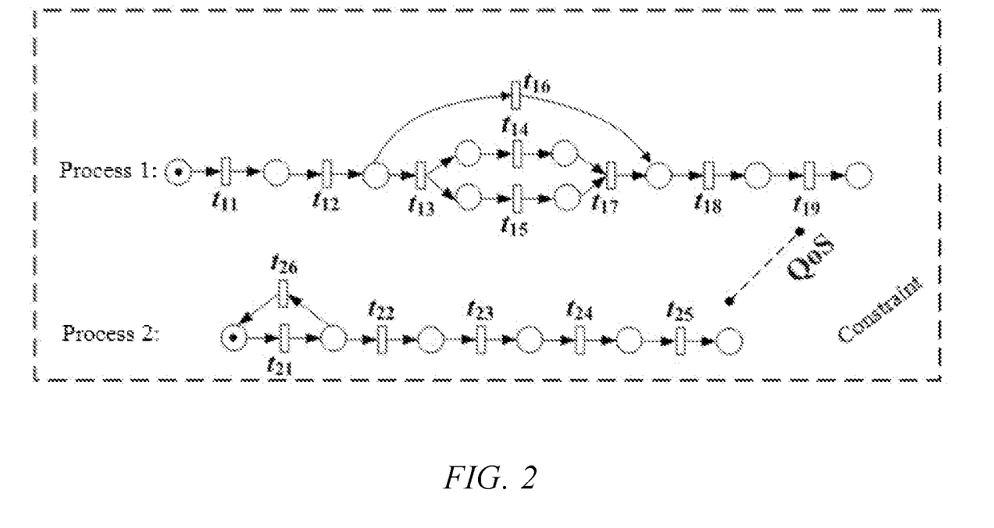
FIG. 2 is a diagram of a service procedure in an example.

As shown in FIG. 2, the example includes two service processes. For example, Process1 is formed by 9 abstract tasks, which are respectively labeled $t_{11}$ to $t_{19}$. Except $t_{13}$ and $t_{17}$, one service needs to be selected for each abstract task for specific implementation. In another aspect, there are a large number of services on a cloud. The services can complete a specific abstract task with different QoS. For example, to implement $t_{11}$, a service $s_{11\_1}$ requires 7 h and $7, and a service s11_2 requires 6 h and $9. In particular, due to service preferences and technical incompatibility, there are various constraint relationships between services, for example, "due to technical incompatibility, the services $s_{23\_5}$ and $s_{24\_8}$ cannot be selected at the same time."

At present, quantities of candidate services of tasks are sequentially: 668, 762, 376, 421, 542, 679, 823, 334, 256, 623, 678, 456, and 579. That is, 668 candidate services can perform the task $t_{11}$, and 762 candidate services can perform the task $t_{12}$, or the like.

Service attributes of each candidate service include five quality attributes "time, cost, reputation, success rate, availability".

Services of each task are divided into four parts, to build a resilient distributed datasets (RDD), so that it is convenient to place each part obtained after division in an executor for parallel execution. For example, because the task $t_{11}$ has 668 services, the services are divided into four parts. Each part includes 167 services. Each executor processes the RDD by defining a map function of a tournament selection algorithm, to implement dominant service trimming of the tournament selection algorithm in parallel. One of the executors is used as an example: Five services are randomly extracted each time, and a plurality of superior services are selected as labeled services according to a tournament selection rule. After nearly 5%×167 services are selected as labeled services, all the remaining candidate services are compared with the eight labeled services, and candidate services inferior to the labeled services are deleted. That is, as long as a candidate service is inferior to any labeled service, the candidate service is deleted, so that 52 services are deleted. Then, results of the executors are collected. QoS values of the remaining candidate services are calculated, and boundary values of service attributes are calculated according to the QoS values of the remaining candidate services. For example, QoS values of {time, cost, reputation, success rate, availability} of one service of an executable task $t_{11}$ are [9.5, 6, 0.95, 0.95, 0.95]. Services are traversed to obtain boundary values of service attributes of candidate services, so that each executor performs block division according to the acquired boundary values of the service attributes.

The block dominance algorithm is run in each executor, to implement in parallel block dominance algorithm-based Skyline service discovery. One of the executors is used as an example. Because a service uses five QoS attribute evaluation criteria, $2^5-1=31$ blocks are obtained through division in one executor, and candidate services of the blocks are deleted by using the block dominance algorithm. After deletion is completed in the executors, candidate services after deletion in the executors are collected, and the block dominance algorithm is run again, to obtain 57 global Skyline services that can meet service function requirements of $t_{11}$. Compared with an original quantity of services, 91.47% of candidate services are deleted, thereby greatly reducing the difficulty of service selection.

Then, in consideration of that some services cannot meet the proposed QoS constraint, attribute dependency constraint, service dependency constraint, service conflict constraint, and other constraints, the flexible Skyline service correction algorithm is further executed. The results show that after the flexible Skyline service correction algorithm is executed, the quantity of candidate services is reduced from the original 57 global Skyline services to 48 flexible Skyline services, and an adjustment rate of the algorithm is 18.75%. Calculation results of flexible Skyline services corresponding to all tasks are shown in Table 1.

TABLE 1

Calculation results of flexible Skyline services

| Candidate task | Quantity of original candidate services | Quantity of global Skyline services | Service reduction rate | Flexible Skyline quantity | Flexible Skyline adjustment rate |
|---|---|---|---|---|---|
| $t_{11}$ | 668 | 57 | 91.47% | 48 | 18.75% |
| $t_{12}$ | 762 | 44 | 94.23% | 36 | 22.22% |
| $t_{14}$ | 376 | 41 | 89.10% | 41 | 0.00% |
| $t_{15}$ | 421 | 14 | 96.67% | 14 | 0.00% |
| $t_{16}$ | 542 | 36 | 93.36% | 36 | 0.00% |
| $t_{18}$ | 679 | 49 | 92.78% | 39 | 25.64% |
| $t_{19}$ | 823 | 28 | 96.60% | 25 | 12.00% |
| $t_{21}$ | 334 | 44 | 86.83% | 44 | 0.00% |
| $t_{22}$ | 256 | 37 | 85.55% | 37 | 0.00% |
| $t_{23}$ | 623 | 69 | 88.92% | 70 | 1.43% |
| $t_{24}$ | 678 | 55 | 91.89% | 56 | 1.79% |
| $t_{25}$ | 456 | 30 | 93.42% | 30 | 0.00% |
| $t_{26}$ | 579 | 54 | 90.67% | 54 | 0.00% |

As can be known from Table 1, deletion rates of services in the service discovery method in this embodiment are generally greater than 80%. It indicates that the QoS-aware parallel flexible Skyline service discovery method in this embodiment can effectively reduce the difficulty of service selection. On this basis, after the flexible Skyline service correction algorithm is executed, adjustment rates of flexible Skyline services are between 0% and 30%. It indicates that the flexible Skyline service correction algorithm proposed in this patent can select more appropriately potential quality services through filtering according to current constraint settings.

A large-scale example is used to verify below the effectiveness of the foregoing service discovery method.

The QoS-aware parallel flexible Skyline service discovery method in this embodiment is recorded as a PRSkyline method. Two parallel Skyline solution methods, namely, a parallel BNL (PBNL) method and a parallel block elimination (PBE) method, are selected for comparison with the PRSkyline method in this embodiment.

Parameters of the PRSkyline method in this embodiment are set as follows: The scale of the tournament selection algorithm is k=5, and the scale of the labeled services is ps=5%. Parameters of other algorithms are set according to the recommendations of related researches. Considering that an execution time has randomness, the algorithms are run 20 times, and effects of the algorithms are evaluated based on solution results and solution time.

(1) Without considering QoS constraints, attribute dependency constraints, service dependency constraints or service conflict constraints, the PRSkyline method in this embodiment is compared with two Skyline service discovery methods, namely, the PBNL method and the PBE method:

It is considered that the scale of the Skyline service discovery method depends on an abstract task and a candidate service quantity. Therefore, two groups of experiments with different problem scales are built to evaluate the performance of the methods. In the first group of experiments, quantities of abstract tasks in service procedures are sequentially 15, 30, . . . , 135, and 150, and a quantity of services of each abstract task is 5000. In the second group of experiments, a quantity of abstract tasks is fixed to 100, and quantities of candidate services corresponding to the abstract tasks are sequentially 1000, 2000, . . . , 9000, and 10000. For comparison of calculation time and solution results of the Skyline service discovery method under different quantities of abstract tasks in the first group of experiments, refer to FIG. 3 and FIG. 4. For comparison of calculation time and solution results of the Skyline service discovery method under different quantities of candidate services in the second group of experiments, refer to FIG. 5 and FIG. 6.

Figure 3:
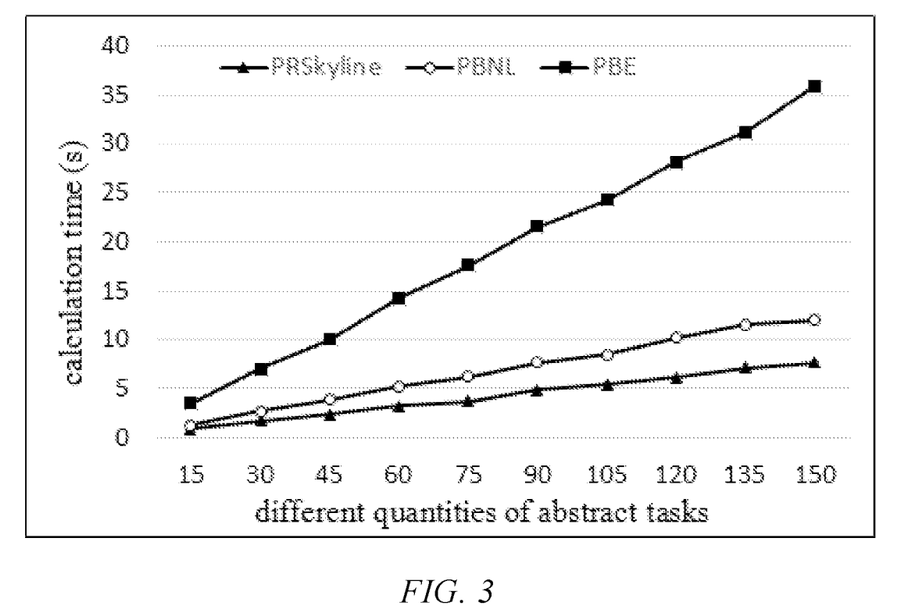
FIG. 3 is a comparison diagram of a calculation time of a Skyline service discovery method under different quantities of abstract tasks in a first group of experiments without considering a first constraint.
Figure 4:
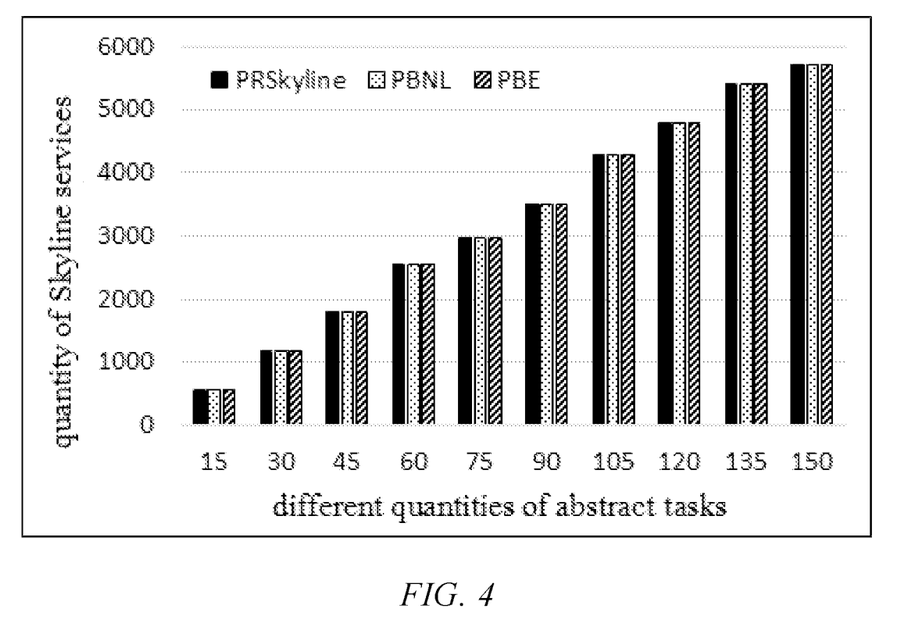
FIG. 4 is a comparison diagram of a solution result of a Skyline service discovery method under different quantities of abstract tasks in a first group of experiments without considering a first constraint.

As can be seen from FIG. 3 and FIG. 4, as the quantity of abstract tasks increases, the calculation time of the Skyline service discovery method increases. In each experiment, the calculation time of the PRSkyline algorithm in this embodiment is the shortest. In addition, for each experiment, the same quantity of Skyline services can be found in all the three methods, indicating that calculations of all the foregoing algorithms are correct.

Figure 5:
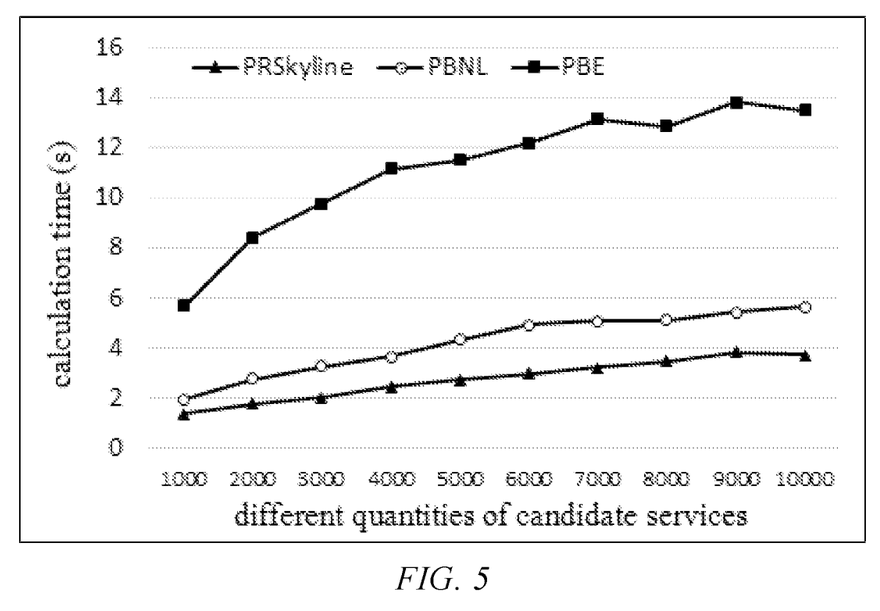
FIG. 5 is a comparison diagram of a calculation time of a Skyline service discovery method under different quantities of candidate services in a second group of experiments without considering a first constraint.
Figure 6:
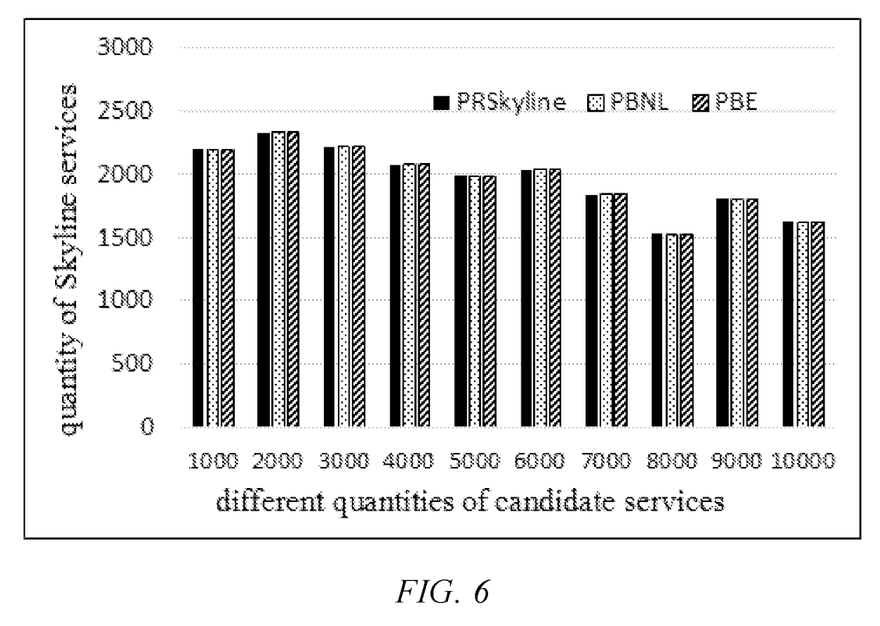
FIG. 6 is a comparison diagram of a solution result of a Skyline service discovery method under different quantities of candidate services in a second group of experiments without considering a first constraint.

As can be seen from FIG. 5 and FIG. 6, when the quantity of candidate services is larger, the calculation time of the Skyline service discovery method is longer. The PRSkyline algorithm in this embodiment takes the shortest time. Similarly, in each experiment, all Skyline services can be found in all the three methods, indicating that calculations of all the foregoing algorithms are correct.

In summary, in different problem scales, all Skyline services can be found in all the three foregoing algorithms. The PRSkyline algorithm in this embodiment takes the shortest time, and the efficiency is increased from 24.49% to 79.52%. An efficiency increase=(a calculation time of a contrast algorithm—a calculation time of our algorithm)/the calculation time of the contrast algorithm.

(2) In consideration of QoS constraints, attribute dependency constraints, service dependency constraints or service conflict constraints, and the PRSkyline method in this embodiment is compared with two Skyline service discovery methods, namely, the PBNL method and the PBE method:

In the first group of experiments, quantities of abstract tasks in service procedures are sequentially 15, 30, . . . , 135, and 150, and a quantity of services of each abstract task is 5000. In the second group of experiments, a quantity of abstract tasks is fixed to 100, and quantities of candidate services corresponding to the abstract tasks are sequentially 1000, 2000, . . . , 9000, and 10000. In the groups of experiments, quantities of QoS constraints, attribute dependency constraints, service dependency constraints, and service conflict constraints are 100. For comparison of calculation time and solution results of the Skyline service discovery method under different quantities of abstract tasks in the first group of experiments, refer to FIG. 7 and FIG. 8. For comparison of calculation time and solution results of the Skyline service discovery method under different quantities of candidate services in the second group of experiments, refer to FIG. 9 and FIG. 10.

The calculation time of PRSkyline is formed by two parts: One part is a total calculation time of the tournament selection algorithm and the block dominance algorithm in the Skyline service discovery method, and is denoted by PRSkyline_S in FIG. 7 and FIG. 9. The other part is a calculation time of the flexible Skyline service correction algorithm, and is denoted by PRSkyline_SS in FIG. 7 and FIG. 9.

Figure 7:
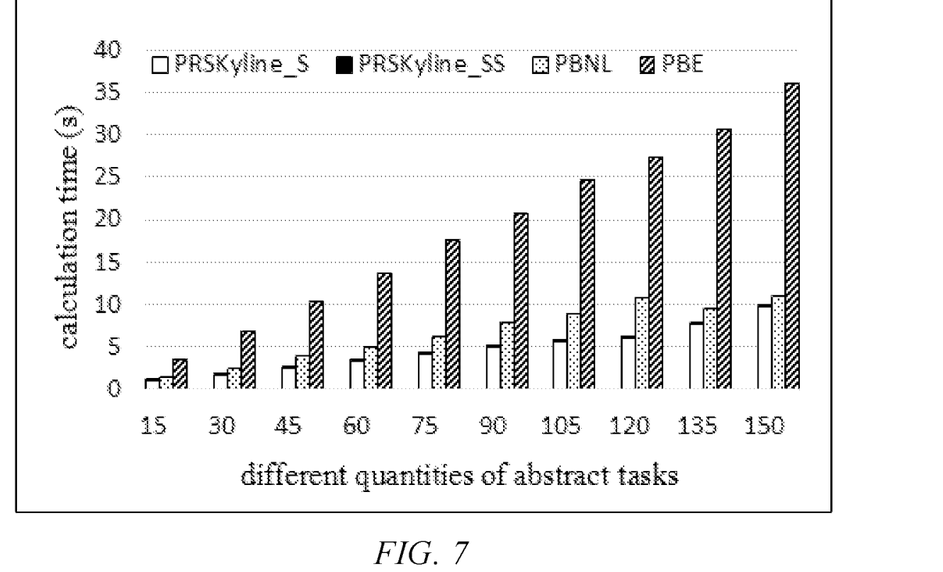
FIG. 7 is a comparison diagram of a calculation time of a Skyline service discovery method under different quantities of abstract tasks in a first group of experiments in consideration of a first constraint.
Figure 8:
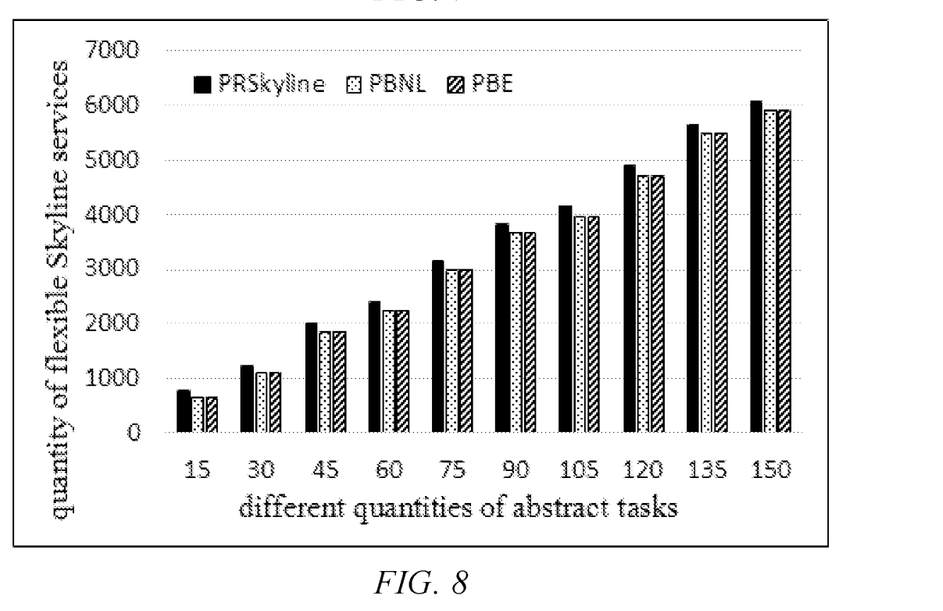
FIG. 8 is a comparison diagram of a solution result of a Skyline service discovery method under different quantities of abstract tasks in a first group of experiments in consideration of a first constraint.

As shown in FIG. 7 and FIG. 8, as the quantity of abstract tasks increases, the solution time of the Skyline service discovery method increases. In each experiment, the calculation time of the PRSkyline method in this embodiment is the shortest. In addition, it may be seen that in a case that the constraints are included, a quantity of flexible Skyline services is different from a quantity of Skyline services. This indicates that compared with the PBNL method and the PBE method, when our PRSkyline algorithm is used, appropriate candidate services can be accurately selected through filtering. When the PBNL method and the PBE method are used, excessive deletion of quality services may occur.

Figure 9:
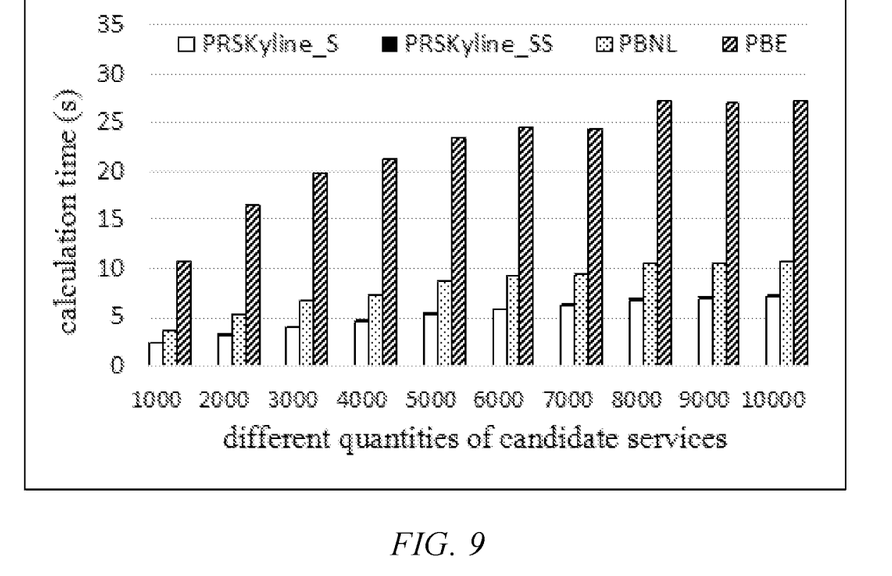
FIG. 9 is a comparison diagram of a calculation time of a Skyline service discovery method under different quantities of candidate services in a second group of experiments in consideration of a first constraint.
Figure 10:
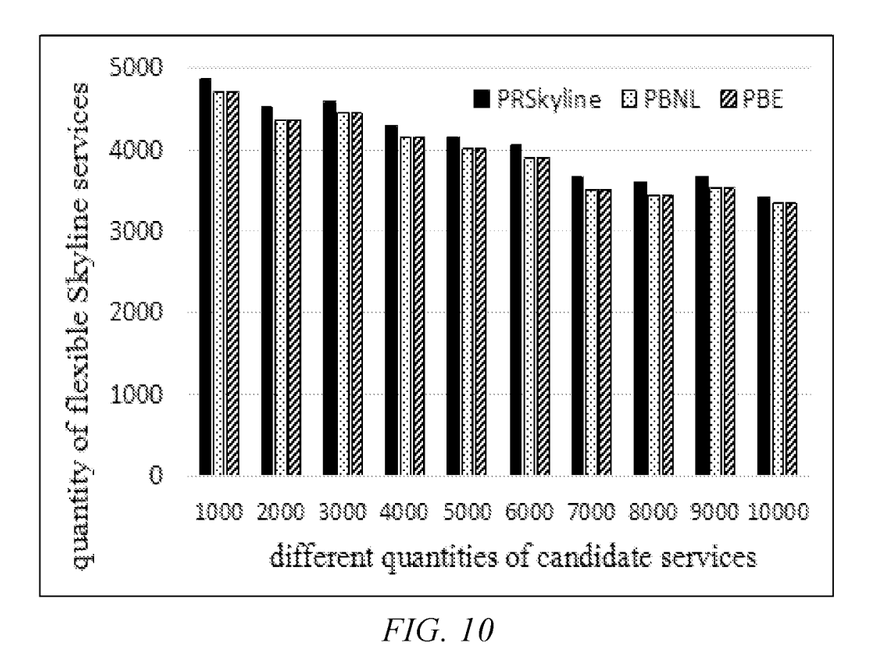
FIG. 10 is a comparison diagram of a solution result of a Skyline service discovery method under different quantities of candidate services in a second group of experiments in consideration of a first constraint.

As shown in FIG. 9 and FIG. 10, as the quantity of candidate services increases, the calculation time of the Skyline service discovery method increases, the PRSkyline algorithm in this embodiment takes the shortest time. Similarly, in a case that the constraints are included, when the PRSkyline algorithm in this embodiment is used, appropriate candidate services can be better selected through filtering.

In summary, in the foregoing experiments including constraints, the PRSkyline algorithm in this embodiment takes the shortest time, and the efficiency is increased from 20.36% to 79.56%. In addition, appropriate candidate services can be selected through filtering more accurately. Compared with the existing Skyline service discovery method, adjustment rates of flexible Skyline services are between 2.59% and 21.43%.

In summary, in the QoS-aware parallel flexible Skyline service discovery method in this embodiment, filtering and trimming are performed for the first time by using a tournament selection algorithm, so that two-by-two comparison between a lot of non-dominant services can be avoided, thereby improving calculation and solution efficiency. Filtering and trimming are performed for the second time by using a block dominance algorithm, so that dominated blocks can be deleted according to dominance relationships between blocks, and two-by-two comparison between services from different blocks can be simplified, thereby further improving solution efficiency. Moreover, for a case in which QoS constraints, attribute dependency constraints, service dependency constraints or service conflict constraints may exist between services, a flexible Skyline service correction algorithm is proposed, thereby avoiding the phenomenon of excessive or insufficient deletion of some adequate services, improving the accuracy of service selection, and facilitating accurate, efficient filtering to obtain quality candidate services. The QoS-aware parallel flexible Skyline service discovery method in this embodiment is applicable to service filtering with or without a first constraint, so that the application range is relatively wide.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a Compact Disc Read-Only Memory (CD-ROM), an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or another programmable device provides steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A quality of service (QoS)-aware parallel flexible Skyline service discovery method, comprising steps of:
    S1) randomly allocating all candidate services of each task to a plurality of parallel nodes, and performing, by each parallel node, a tournament selection algorithm in parallel to filter and trim candidate services inside the parallel node;
    S2) acquiring boundary values of service attributes of the candidate services after filtering and trimming, and making each parallel node perform block division according to the acquired boundary values of the service attributes; and
    reallocating the candidate services after filtering and trimming to the plurality of parallel nodes, and attributing candidate services allocated in each parallel node to a corresponding block;
    S3) performing, by each parallel node, a block dominance algorithm to filter candidate services inside the parallel node to obtain local Skyline services;
    S4) collecting all local Skyline services to form a first set, and then performing filtering on the first set by using the block dominance algorithm to obtain global Skyline services;
    S5) determining whether there is a first constraint in the global Skyline services, and if yes, performing step S6), or otherwise, directly outputting the global Skyline services, wherein
    the first constraint comprising a QoS constraint, an attribute dependency constraint, a service dependency constraint or a service conflict constraint; and
    S6) processing tasks involved in the first constraint by using a flexible Skyline service correction algorithm to obtain a flexible Skyline service set for output.

2. The QoS-aware parallel flexible Skyline service discovery method according to claim 1, wherein the performing, by each parallel node, a tournament selection algorithm to filter and trim candidate services inside the parallel node in Step S1) comprises: selecting a plurality of candidate services from the candidate services inside the parallel node according to a tournament selection rule as labeled services, comparing the remaining candidate services with the plurality of labeled services, and then eliminating a candidate service inferior to at least one labeled service.

3. The QoS-aware parallel flexible Skyline service discovery method according to claim 1, wherein interval values of service attributes of candidate services in different blocks are not identical, it indicates that a service attribute is better when an interval value of the service attribute is larger, the Step S3) further comprises:
    sequentially performing filtering a plurality of times, wherein a quantity of times of filtering is equal to a quantity of block division, and candidate services eventually obtained after filtering a plurality of times are the local Skyline services; and
    selecting one block as a representative block in each filtering process, wherein a different representative block is selected in each filtering process; and each filtering process comprises: first performing filtering to obtain Skyline services in the representative block, then separately comparing candidate services in another block with a block number less than that of the representative block with the Skyline services in the representative block to acquire dominance relationships, and then deleting candidate services that are in another block with a block number less than that of the representative block and are dominated by the Skyline services in the representative block, wherein
    during each filtering process, if an interval value of one service attribute of a candidate service in another block is less than an interval value of a corresponding service attribute of a Skyline service in the representative block, the service attribute no longer participates in comparison.

4. The QoS-aware parallel flexible Skyline service discovery method according to claim 1, wherein if there is a QoS constraint between different tasks, the processing tasks involved in the QoS constraint by using a flexible Skyline service correction algorithm in step S6) comprises: defining a task to be processed by using the flexible Skyline service correction algorithm as a to-be-determined task, defining another task having a QoS constraint with the to-be-determined task as a correlated task, obtaining limit values of QoS values of global Skyline services in each correlated task, aggregating limit values of QoS values in all correlated tasks to calculate a correlation value, performing aggregation calculation on the QoS value of each global Skyline service in the to-be-determined task and the correlation value to obtain a determination value, and deleting a corresponding global Skyline service that is in the to-be-determined task and has a determination value that fails to meet the QoS constraint.

5. The QoS-aware parallel flexible Skyline service discovery method according to claim 1, wherein if the global Skyline services have an attribute dependency constraint, the processing tasks involved in the attribute dependency constraint by using a flexible Skyline service correction algorithm in step S6) comprises: defining a non-Skyline service having an attribute dependency constraint with the global Skyline services as a to-be-processed service, determining whether the to-be-processed service can be a non-dominant service in a task to which the to-be-processed service belongs after the attribute dependency constraint is performed, and if yes, adding the to-be-processed service to the task to which the to-be-processed service belongs, or otherwise, skipping processing.

6. The QoS-aware parallel flexible Skyline service discovery method according to claim 1, wherein if the global Skyline services have a service dependency constraint, the processing tasks involved in the service dependency constraint by using a flexible Skyline service correction algorithm in step S6) comprises: defining a task to be processed by using the flexible Skyline service correction algorithm as a to-be-determined task, and defining all candidate services that have a service dependency constraint with the global Skyline services in the to-be-determined task as antecedent dependency services;

if there is a unique global Skyline service in the to-be-determined task, determining whether the antecedent dependency services all exist in global Skyline services in other tasks other than the to-be-determined task, wherein if yes, processing is skipped, or if not, an antecedent dependency service is added to a task to which the antecedent dependency service belongs, a first suboptimal service is added to the to-be-determined task, there is no service dependency constraint between the first suboptimal service and the antecedent dependency service, and the first suboptimal service can be a non-dominant service when the global Skyline service is not considered in the to-be-determined task; and  if there are nonunique global Skyline services in the to-be-determined task, skipping processing.

7. The QoS-aware parallel flexible Skyline service discovery method according to claim 1, wherein if the global Skyline services have a service conflict constraint, the processing tasks involved in the service conflict constraint by using a flexible Skyline service correction algorithm in step S6) comprises: defining a task to be processed by using the flexible Skyline service correction algorithm as a to-be-determined task, defining all candidate services that have a service conflict constraint with the global Skyline services in the to-be-determined task as antecedent conflict services, and if there is a unique global Skyline service in the to-be-determined task, determining whether an antecedent conflict service exists in a global Skyline service in another task other than the to-be-determined task and the antecedent conflict service is a unique global Skyline service in the task to which the antecedent conflict service belongs, wherein if yes, a second suboptimal service is added to the to-be-determined task, and a third suboptimal service is added to the task to which the antecedent conflict service belongs, or if not, processing is skipped, wherein  the second suboptimal service does not have a service conflict constraint with the antecedent conflict service, and can be a non-dominant service when the global Skyline service is not considered in the to-be-determined task; and  the third suboptimal service does not have a service conflict constraint with the global Skyline service in the to-be-determined task, and can be a non-dominant service when the antecedent conflict service is not considered in the task to which the antecedent conflict service belongs.

\* \* \* \* \*